Patented Sept. 7, 1954

2,688,637

UNITED STATES PATENT OFFICE 2,688,637

N-ALKYLCAPROANILIDES

Gerald H. Coleman, Freeland, and Dalton B. McCaskey, Midland, Mich., assignors to The Dow Chemical Company, Midland, Mich., a corporation of Delaware No Drawing. Application June 10, 1953, Serial No. 360,816

6 Claims. (Cl. 260—562)

This invention concerns certain new N-alkylcaproanilides having the general formula:

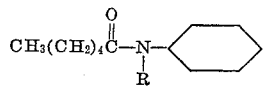

wherein R represents a normal alkyl radical containing from 4 to 12 carbon atoms. The invention also relates to a method for making the compounds.

This application is a continuation-in-part of our prior application Serial No. 254,438, filed November 1, 1951, now abandoned.

The new alkylcaproanilides are compatible with synthetic resins such as polyvinyl chloride, or copolymers of vinyl chloride and vinylidene chloride. They are useful as plasticizers or modifying agents in the preparation of thermoplastic compositions from such polymers. Compositions of such polymers containing 15 and 30 per cent by weight of the N-alkylcaproanilides have been prepared. The N-nor.-alkylcaproanilides are toxic to insects and fungi. They are useful as the active ingredient in the preparation of insect repellants and fungicides. It may be mentioned that the new N-nor.-alkylcaproanilides having from 4 to 12 carbon atoms in the alkyl radical have been found to be substantially better plasticizing agents for polyvinyl chloride, and to possess greater toxicity for control of insects, e. g. the two-spotted mite, than have the N-alkylcaproanilides containing lower or higher alkyl radicals such as N-methylcaproanilide, N-ethylcaproanilide or N-hexadecylcaproanilide, which have been tested for similar purposes.

The new compounds may be prepared in any of several ways. For instance, an N-nor.-alkylaniline having from 4 to 12 carbon atoms in the alkyl radical may be reacted with caproyl chloride in a solvent such as benzene, or toluene, in the presence of pyridine as a hydrogen chloride acceptor, or the N-nor.-alkylaniline may be reacted with caproic acid in the presence of phosphorus trichloride and a solvent. In a preferred embodiment of the invention, the new compounds are prepared by reacting an N-nor.-alkylaniline having from 4 to 12 carbon atoms in the alkyl radical with a mixture of caproic acid and acetic anhydride, or by reacting an N-nor.-alkylacetanilide having from 4 to 12 carbon atoms in the alkyl radical with caproic acid. The reaction to form an N-alkylcaproanilide is that of caproic acid with an N-alkylacetanilide. The latter compound may be used directly in the reaction, or it may be prepared in situ.

The reaction is preferably carried out by heating a mixture of the reactants, e. g. a mixture of equimolar proportions of N-nor.-butylacetanilide and caproic acid, or a mixture of equimolar proportions of N-nor.-butylaniline, caproic acid and acetic anhydride, to a reaction temperature such as to distill acetic acid from the reaction mixture as it is formed. By removing the acetic acid from the reaction as it is formed, the reaction is caused to proceed smoothly and results in good yields of the N-nor.-alkylcaproanilide product. Substantially equimolar proportions of the N-nor.-alkylacetanilide and the caproic acid have been found to be satisfactory, although somewhat greater or lesser proportions of the reactants may be used. The reaction may be carried out at a temperature of from 60° to 110° C. in the presence of a solvent such as benzene or toluene without removal of the acetic acid from the reaction as it is formed. The reaction is usually carried out at temperatures between 180° and 320° C., preferably between 220° and 300° C. and in the absence of a solvent, or inert liquid medium, with distilling and removal of the acetic acid from the reaction as it is formed. When the reaction is complete the crude mixture may be fractionally distilled under reduced pressure or, if a solid product be obtained, purification may be accomplished by crystallization of the product from a solvent.

The following examples illustrate the invention but are not to be construed as limiting the same.

Example 1

A mixture of 298 grams (2 moles) of N-nor.-butylaniline and 232 grams (2 moles) of caproic acid, together with 1 liter of toluene as reaction medium and solvent was placed in a reaction vessel equipped with a reflux condenser, a dropping funnel and a stirrer. The mixture was stirred and maintained at a temperature of 60° C. while adding 165 grams (1.2 moles) of phosphorus trichloride thereto dropwise over a period of one hour. Thereafter, the mixture was heated at reflux (110° C.) for 8 hours longer. The reaction mixture separated into two layers. The upper toluene layer was separated and was fractionally distilled. There was obtained 356.6 grams of N-nor.-butylcaproanilide as a substantially colorless liquid boiling at 137°–138° C. at 1 millimeter absolute pressure and having a specific gravity of 0.9463 at 25° C. and an index of refraction $n_D^{25}=1.4984$.

A portion of the above N-nor.-butylcaproanilide product was employed as the active ingredient in an aqueous spray composition containing one pound of the dispersed product per 100 gallons of the spray mixture. The spray mixture was applied to mature cranberry bean plants that were heavily infected with adult two-spotted mites. Six days following application of the spray mixture the bean plants were examined. Complete control of the two-spotted mite was observed, i. e. the control was 100 per cent.

In contrast, N-ethylcaproanilide gave only 55 per cent control of the two-spotted mite, when tested under similar conditions.

Three parts by weight of the above N-nor.-butyl-caproanilide product was mixed with seven parts of a resinous polyvinyl chloride in powdered form. The mixture was molded to form test bars of ⅛ x ⅛ inch cross section. The N-nor.-butylcaproanilide product was compatible with the polyvinyl chloride resin and formed clear molded test bars. These test bars were used to determine the effect of the N-nor.-butylcarproanilide as a plasticizer for the polyvinyl chloride at low temperatures. The method for evaluating the plasticizing effect of the N-nor.-butylcaproanilide product for the polyvinyl chloride was to determine a temperature-Young's modulus relationship for a test bar by procedure similar to that described by Moll and LeFevre, Ind. and Chem. Eng., vol. 40 pages 2172–79, 1948. The temperature at which a test bar of the composition had a Young's modulus of $1 \times 10^5$ pounds per square inch was determined. The plasticizing effect is greater the lower the temperature at which a test bar of the composition has a preselected Young's modulus. The N-nor.-butylcaproanilide product had a plasticizing effect corresponding to a Young's modulus of $1 \times 10^5$ pounds per square inch for the composition at a temperature of —43° C. In contrast, the plasticizing effect of a similar proportion of N-ethylcaproanilide for polyvinyl chloride at a Young's modulus of $1 \times 10^5$ pounds per square inch corresponds to a temperature of only —27° C. when tested under similar conditions.

Example 2

A mixture of 204 grams (1.15 moles) of N-nor.-hexylaniline, 135 grams (1.3 moles) of acetic anhydride and 116 grams (1 mole) of caproic acid was gradually heated up to a temperature of 300° C. while distilling acetic acid from the reaction as it was formed. The crude reaction mixture was distilled. There was obtained 142 grams of N-nor.-hexylcaproanilide as a liquid boiling at 159°–163° C. at 1 millimeter absolute pressure and having a specific gravity of 0.9364 at 25° C. and an index of refraction $n_D^{25}=1.4942$.

Example 3

N-nor.-octylcaproanilide was prepared by heating a mixture of 205 grams (1 mole) of N-nor.-octylaniline, 130 grams (1.3 moles) of acetic anhydride and 116 grams (1 mole) of caproic acid up to a temperature of 260° C. over a period of 6 hours and distilling acetic acid from the reaction as it was formed. The crude reaction mixture was fractionally distilled. There was obtained 40 grams of N-nor.-octylcaproanilide as a yellow liquid boiling at 163°–165° C. at 1 millimeter absolute pressure and having a specific gravity of 0.9217 at 25° C. and an index of refraction $n_D^{25}=1.4919$.

Example 4

A mixture of 71 grams (0.272 mole) of N-nor.-dodecylaniline, 31 grams (0.3 mole) of acetic anhydride and 35 grams (0.3 mole) of caproic acid was gradually heated up to a temperature of 240° C. over a period of 5 hours. Acetic acid was distilled from the reaction as it was formed. The crude reaction mixture was fractionally distilled. There was obtained 81 grams of N-nor.-dodecylcaproanilide as a clear yellow liquid boiling at 207°–212° C. at 2 millimeters absolute pressure and having a specific gravity of 0.9187 at 25° C. and an index of refraction $n_D^{25}=1.4912$.

Three parts by weight of the above N-nor.-dodecylcaproanilide product was mixed with seven parts of a resinous polyvinyl chloride in powdered form. The mixture was molded to form test bars of ⅛ x ⅛ inch cross-section. The N-nor.-dodecylcaproanilide product was compatible with the polyvinyl chloride and formed clear test bars. The test bars were used to determine a plasticizing effect of the N-nor.-dodecylcaproanilide for the polyvinyl chloride at low temperatures as described in Example 1. The N-nor.-dodecylcaproanilide had a plasticizing effect corresponding to a Young's modulus of $1 \times 10^5$ pounds per square inch at a temperature of —49° C.

In contrast, the plasticizing effect of a similar proportion of N-methylcaproanilide for polyvinyl chloride at a Young's modulus of $1 \times 10^5$ pounds per square inch corresponds to a temperature of only —8.3° C., when tested under similar conditions.

A portion of the N-nor.-dodecylcaproanilide product was tested as the active ingredient for control of the adult two-spotted mite on mature cranberry bean plants by procedure as described in Example 1. The per cent kill of the two-spotted mite was 86 per cent. In contrast, N-methylcaproanilide gave a kill of only 40 per cent when tested under similar conditions.

Example 5

A mixture of 154 grams (0.75 mole) of N-nor.-amylacetanilide and 92 grams (0.8 mole) of caproic acid was stirred and gradually heated to a temperature of 295° C. over a period of 6.5 hours, while distilling acetic acid from the reaction mixture as it was formed. The distillate contained 44 grams of acetic acid. The residual crude reaction mixture was fractionally distilled. There was obtained 130 grams of N-nor.-amylcaproanilide as an amber liquid boiling at 138°–139° C. at 1 millimeter absolute pressure. The product had a specific gravity of 0.9411 at 25° C. and an index of refraction $n_D^{25}=1.4981$.

The N-nor.-amylcaproanilide product was tested for control of the adult two-spotted mite on mature cranberry bean plants as described in Example 1. The per cent kill of the two-spotted mite was 81 per cent.

We claim:

1. As a new chemical compound, an N-alkylcaproanilide having the formula:

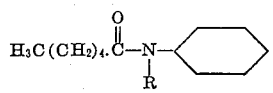

wherein R represents a normal alkyl radical containing from 4 to 12 carbon atoms.

2. N-n-butylcaproanilide.
3. N-n-amylcaproanilide
4. N-n-hexylcaproanilide.
5. N-n-octylcaproanilide.
6. N-n-dodecylcaproanilide.

References Cited in the file of this patent

Wiselogle: "Survey of Antimalarial Drugs," vol. II, part I, pp. 566 and 568, July 1946.